United States Patent [19]

Sanderson

[11] 4,399,271
[45] Aug. 16, 1983

[54] NONHALOGENATED FLAME RESISTANT SULFONYL AMIDE COPOLYCARBONATE

[75] Inventor: John R. Sanderson, Austin, Tex.

[73] Assignee: Mobay Chemical Corporation, Pittsburgh, Pa.

[21] Appl. No.: 288,704

[22] Filed: Jul. 30, 1981

[51] Int. Cl.³ ............................................. C08G 63/62
[52] U.S. Cl. .................................. 528/172; 528/196; 528/203; 528/204
[58] Field of Search ................ 528/172, 196, 204, 203

[56] References Cited

U.S. PATENT DOCUMENTS 3,475,372 10/1969 Gable ................................. 260/45.75

FOREIGN PATENT DOCUMENTS 2000515 1/1979 United Kingdom .

Primary Examiner—Harold D. Anderson
Attorney, Agent, or Firm—Gene Harsh; Lawrence S. Pope; Aron Preis

[57] ABSTRACT

A thermoplastic aromatic copolycarbonate resin is provided having an enhanced flame retardance and characterized in that its molecular structure comprises polycondensation residues of

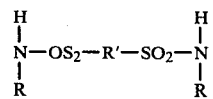

wherein R and R' independently are organic radicals.

13 Claims, No Drawings

NONHALOGENATED FLAME RESISTANT SULFONYL AMIDE COPOLYCARBONATE

FIELD OF THE INVENTION

The present invention relates to polycarbonates and in particular to sulfonylamide copolycarbonates.

BACKGROUND OF THE INVENTION

Polycarbonates derived from reactions involving organic dihydroxy compounds and carbonic acid derivatives have found extensive commercial application because of their excellent mechanical and physical properties. These thermoplastic polymers are particularly suited for the manufacture of molded products where impact strength, rigidity, toughness, thermal and dimensional stability as well as excellent electrical properties are required.

However, these polymers exhibit a brief though definite burning time when contacted with an open flame and do not meet a specified requirement for flammability resistance in applications where high temperatures and/or exposure to fire may be encountered. In addition, stabilizers or other functional additives which are normally used in polycarbonates will further modify the burning characteristics of the plastic to make them unacceptable where a certain flame retardance requirement is specified.

Also stabilizers and functional additives such as monomeric phosphates, phosphoric acid esters and thiophosphoric acid esters containing halogenated alkyl radicals have been incorporated into polymers to increase their flame resistant properties. Metal salts have also been utilized to provide flame retardance characteristics to polycarbonates. Further, in aromatic polycarbonate resins some of the phenolic diols used in the production thereof have chlorine or bromine atoms substituted on the aromatic ring to provide flame resistant characteristics to the final polycarbonate.

However, in order to obtain the flame resistant characteristics these stabilizers and halogenated phenolic diols have to be employed in such large quantities that they may reduce the desirable physical properties of the polymers such as impact strength and may even cause considerable deterioration in other physical properties such as resistance to hydrolysis. A particular disadvantage in using the halogenated diols in the synthesis of the polycarbonate is the increased cost of the final resin to an economically undesirable extent.

Illustrative of the techniques utilized to provide flame retardant characteristics to polycarbonates is U.S. Pat. No. 3,475,372.

It is thus an object of the present invention to provide an alternative by way of a copolycarbonate wherein molecular chains are incorporated units comprising sulfonylamide groups which impart an enhanced level of flame retardance to the polycarbonate.

It is a further object of the invention to provide a process by which sulfonyl amide groups are to be incorporated in the molecular structure of polycarbonates.

A plasticized polycarbonate composition comprising an aromatic polycarbonate into which admixed is an organic sulfonamide plasticizer was disclosed in British Pat. No. 2,000,515.

SUMMARY OF THE INVENTION

A copolycarbonate of enhanced flame retardance is provided comprising the reaction product of an at least one aromatic diphenol, a sulfonylamide compound and a carbonate precursor.

DETAILED DESCRIPTION OF THE INVENTION

The copolycarbonates of the invention are thermoplastic compounds having a molecular weight of 10,000 to 200,000, preferably 20,000 to 80,000 (weight average molecular weight) which may be prepared by the diphasic interface process by polycondensation (see German OS Nos. 2,063,050; 2,063,052; 1,570,703; 2,211,956; 2,211,957 and 2,248,817 and French Pat. No. 1,561,518, monograph "H. Schnell, *Chemistry and Physics of Polycarbonates,* Interscience Publishers, New York, 1964", all incorporated herein by reference).

The aromatic copolycarbonates may be based on any of the following bisphenols or their mixtures: hydroquinone, resorcinol, dihydroxy diphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfoxides, bis-(hydroxyphenyl)-sulfones and $\alpha,\alpha'$-bis-(hydroxyphenyl)-diisopropyl benzenes, as well as the corresponding compounds with varying substituents. These and other suitable aromatic dihydroxy compounds have been described in U.S. Pat. Nos. 3,028,365; 2,999,835; 3,148,172; 3,271,368; 2,991,273; 3,271,367; 3,780,078; 3,014,891 and 2,999,846 and in German OS Nos. 1,570,703; 2,063,050 and 2,063,052 and in French Pat. No. 1,561,518, all incorporated herein by reference.

Preferred bisphenols correspond to the formulae (1) or (2)

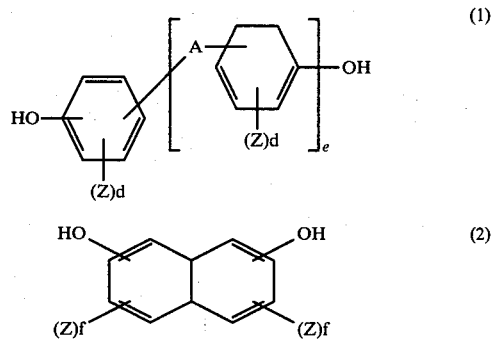

in which

A denotes a single bond, an alkylene group with 2 to 10 carbon atoms, an alkylidene group with 1 to 10 carbon atoms, a cycloalkylene group with 5 to 15 carbon atoms, a cycloalkylidene group with 5 to 15 carbon atoms, a cycloalkylalkylene group with 7 to 20 carbon atoms, a cycloalkylalkylidene group with 6 to 20 carbon atoms, a sulfonyl group, a sulfoxide group, a carbonyl group, oxygen or sulfur, e denotes the number 0 to 1, Z denotes H, F, Cl, Br or $C_1$–$C_{10}$-alkyl and if several Z radicals are substituents of one aryl radical they may be identical to or different from one another, d denotes 0 or an integer from 1 to 4 and f denotes 0 or an integer from 1 to 3.

Particularly preferred compounds of the formula (1) are those in which e denotes 1, A denotes: a single bond, the isopropylidene radical, the $SO_2$ group or sulfur; and d denotes zero,
and, in particular, 4,4'-dihydroxydiphenyl, 2,2-bis-(4-hydroxyphenyl)-propane (=bisphenol A) and 4,4'-dihydroxydiphenyl sulfone.

Also suitable are the phenolphthalene compounds used for the preparation of phenolphthalene type polycarbonates, such as are described in U.S. Pat. Nos. 3,036,036 and 4,210,474, incorporated herein by reference.

In the most preferred embodiment halogen substituents of the aromatic rings of the above diphenols are excluded.

The sulfonylamide compounds suitable in the practice of the invention are those conforming to formula (6):

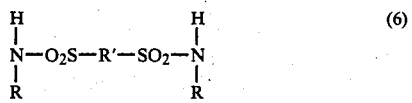

wherein R and R' independently denote organic radicals preferably aromatic, specifically R may denote a $C_1$–$C_{30}$ alkyl, $C_4$–$C_{10}$ cycloalkyl, $C_6$–$C_{14}$ aryl or a substituted aryl, preferably a phenyl radical and R' may be a $C_1$–$C_{30}$ alkylene, $C_6$–$C_{14}$ arylene, $C_7$–$C_{30}$ alkarylene, $C_7$–$C_{30}$ aralkylene, preferably a biphenyl or a biphenyl ether, with the proviso that it does not decompose at the temperatures commonly employed in the processing of polycarbonates. In the preferred embodiments, R' denotes a biphenyl or a biphenyl ether and R denotes a phenyl radical. R' may also be a residue of any of the bisphenols mentioned above as suitable for the synthesis of polycarbonates.

The carbonate precursors may be phosgene, carbonyl bromide or bis-chloroformic esters of an aromatic dihydroxy compound.

In the context of the present invention, the amount of sulfonylamide that may be incorporated is preferably up to 50 mol percent and most preferably between 0.1 and 30 mol percent, in either case relative to the mols of sulfonylamide bisphenols plus amide entailed in the polycondensation process for the preparation of the resin of the invention.

In order to obtain special properties, mixtures of diphenols may be used. By far the most useful polycarbonate resins are those based on 4,4'-dihydroxydiaryl methanes and more particularly bisphenol A [2,2-(4,4'-dihydroxydiphenyl)-propane].

The polycarbonates of the invention may also be branched by incorporating small quantities of polyhydroxyl compounds in them by condensation, e.g., 0.05–2.0 mol percent (based on the quantity of bisphenols used). Polycarbonates of this type have been described, for example in German OS Nos. 1,570,533, 1,595,762, 2,116,974 and 2,113,347; British Pat. Nos. 885,442 and 1,079,821; U.S. Pat. Nos. 3,544,514 and 4,185,009, all incorporated by reference herein. The following are some examples of polyhydroxyl compounds which may be used for this purpose: phloroglucinol; 4,6-dimethyl-2,4,6-tri-(4-hydroxyphenyl)-heptane-2; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl]-propane; 2,4-bis-(4-hydroxyphenyl-4-isopropyl)-phenol; 2,6-bis-(2'-dihydroxy-5'-methylbenzyl)-4-methylphenol; 2,4-dihydroxy-benzoic acid; 2-(4-hydroxyphenyl)-2-(2,4-dihydroxyphenyl)-propane and 1,4-bis-(4',4''-dihydroxytriphenyl-methyl)-benzene and 3,3-bis-(4-hydroxyphenyl)-oxindole.

In addition to the polycondensation process mentioned above and which essentials are described below, another process for the preparation of the polycarbonates of the invention is polycondensation in a homogeneous phase. The suitable processes are disclosed in the incorporated herein by reference U.S. Pat. Nos. 3,028,365; 2,999,846; 3,248,414; 3,153,008; 3,215,668; 3,187,065; 2,064,974; 2,070,137; 2,991,273 and 2,000,835.

The preferred process is the interfacial polycondensation process.

According to the interfacial polycondensation process, copolycarbonate resins are obtained by reacting the aromatic dihydroxy compounds with an alkali metal hydroxide or alkaline earth metal oxide or hydroxide to form the salt of the hydroxy compounds. The salt mixture in an aqueous solution or suspension is reacted with phosgene, carbonyl bromide or bischloroformic esters of the aromatic dihydroxy compounds and the sulfonylamide compound and catalyst are then added. An organic solvent is provided in the reaction admixture which is a solvent for the polymer but not for the aromatic dihydroxy salts. Thus, chlorinated aliphatic hydrocarbons or chlorinated aromatic hydrocarbons are used as the organic solvent which dissolves the condensation product. In order to limit the molecular weight, one may use monofunctional reactants such as monophenols, for example, the propyl-, isopropyl- and butylphenols, especially p-tert-butyl-phenol and phenol itself. In order to accelerate the reaction, catalysts such as tertiary amines, quaternary ammonium, phosphonium or arsonium salts and the like may be used. The reaction temperature should be about −20° to +150° C., preferably 0° to about 100° C.

According to the polycondensation process in a homogeneous phase, the dissolved reaction components are polycondensed in an inert solvent in the presence of an equivalent amount of a tertiary amine base required for absorption of the generated HCl, such as e.g., N,N-dimethyl-aniline; N,N-dimethyl-cyclohexylamine or, preferably, pyridine and the like.

It is to be understood that it is possible to combine in the processes described above in a chemically meaningful way both the aromatic dihydroxy compounds and the monohydroxy compounds in the form of the alkali metal salts and/or bis-haloformic acid esters and the amount of phosgene or carbonyl bromide then still required in order to obtain high molecular products. Other methods of synthesis in forming the polycarbonates of the invention such as disclosed in U.S. Pat. No. 3,912,688, incorporated herein by reference, may be used.

The polycarbonate resins of the invention may be further improved or altered by blending therewith additives, fillers or reinforcing agents known in the art.

Among the additives, perfluoroalkane sulfonic acid salts of alkali metals such as taught in U.S. Pat. No. 3,775,367 may be added, in an amount of 0.01 to 1 weight percent, relative to the weight of the resin, for further improvement in flammability rating.

The preparation of 4,4'-bis(diphenyl sulfonamide)-diphenyl ether may be carried out as follows: 734 grams (2.0 mols) of 4,4'-bis(sulfonyl chloride)biphenyl ether were dissolved in two liters of $CH_2Cl_2$ and filtered to isolate the mother liquor from the insoluble impurities and the liquor then charged into a three-necked flask. 810 ml (8.7 mols) of aniline were added slowly while the temperature of the mixture was kept at about 25° to 30° C. The resulting slurry was then filtered and twice washed with CH$_2$Cl$_2$ and dried. The material was then dissolved in a methanol plus water solution and recrystallized. 400 grams of crude 4,4'-bis(diphenyl sulfonamide)diphenyl ether (PSAE) in one liter of methanol were heated to boiling, water (about 10 volume percent) was slowly added until the solution becomes turbid, and the mixture then cooled to 25° C. and filtered. The filtrate was then washed with water and dried first in air and then under vacuum at 70° C. for six hours, and washed again in a 50% solution of methanol in water and redried in a vacuum oven. The melting point was determined to be about 152°–154° C. and the recovery was noted to be about 95% after recrystallization.

The elemental chemical analysis of the compound was

|   | Percent |
|---|---------|
| C | 59.99   |
| H | 4.20    |
| N | 5.81    |
| S | 12.99   |

The material was reacted with bisphenol A and phosgene in accordance with the interfacial polycondensation reaction described above.

EXAMPLES

EXAMPLE 1

A copolymer of bisphenol A and PSAE (4,4'-bis(diphenylsulfonamide)diphenyl ether) was prepared by phosgenation of a mixture containing 2.5 weight percent PSAE and 97.5% bisphenol A. An aqueous solution of bisphenol A was prepared by simultaneously charging into a suitable mixing vessel, 9.1 kg of bisphenol A, 44.9 kg of water, 6.5 kg of 50% aqueous sodium hydroxide, and 0.12 kg of phenol. 33.7 kg/hr of this solution was continuously phosgenated with 2.6 kg/hr of phosgene in 43.1 kg/hr of 1:1 methylene chloride:-monochlorobenzene solvent. 2.4 kg/hr of 25% aqueous caustic was added to maintain the proper pH for the interfacial reaction. The phosgenated solution was then mixed with 8.7 kg/hr of a 1.5% PSAE solution in methylene chloride followed by the addition of 1.3 kg/hr of 25% aqueous sodium hydroxide and 0.025 kg/hr of triethylamine to catalyze the polycondensation reaction. The average time to complete the reaction was 45 minutes. The organic phase was separated from the aqueous phase and the organic phase containing the high molecular weight copolycarbonate was washed with aqueous sodium hydroxide solution, dilute phosphoric acid solution and water. The polymer solution was concentrated by evaporation of the solvent and the polymer recovered by passing the concentrated solution through a devolatilizing extruder. The polymer prepared in this fashion had a relative viscosity of 1.233 (0.37% in methylene chloride). The polycondensation reaction was carried out at about 25° to 30° C. The properties listed below characterize that copolycarbonate:

| Yellowness index | 4.2 |
|---|---|

| -continued | |
|---|---|
| Oxygen index | 28.5 |
| UL-94 flammability test: | |
| 1/16" bars | V-2 |
| Average burn | 4.1 sec. |
| ⅛" bars | V-2 |
| Average burn | 3.2 sec. |
| Impact strength, notched Izod (ft.lb/in) | |
| ⅛" bars | 12.33 |
| ¼" bars | 1.7 |
| Critical thickness (mils) | 145 |
| Heat distortion temperature (°C.) | |
| at 264 psi | 130.3 |
| at 60 psi | 142.8 |

EXAMPLE 2

The copolycarbonate of Example 1 was blended with about 0.1% by weight of a perfluoroalkane sulfonate salt. The properties of the composition are shown below:

| Yellowness index @ 650° F. | 4.6 |
|---|---|
| Melt index | 16.0 |
| Oxygen index | 36.0 |
| UL-94 flammability test: | |
| 1/16" bars | V-2 |
| Average burn | 1.7 sec. |
| ⅛" bars | V-0 |
| Average burn | 0.8 sec. |
| Impact strength, notched Izod (ft.lb/in) | |
| ⅛" bars | 12.8 |
| ¼" bars | 1.4 |
| Critical thickness (mils) | 145 |
| Heat distortion temperature (°C.) | |
| at 264 psi | 128.7 |
| at 66 psi | 142.9 |

Although the invention has been described in detail for the purpose of illustration it is to be understood that such detail is solely for that purpose and that variations can be made therein by those skilled in the art without departing from the spirit and scope of the invention except as it may be limited by the claims.

What is claimed is:

1. A thermoplastic aromatic copolycarbonate resin comprising the polymeric reaction product of (i) at least one aromatic diphenol (ii) a carbonate precursor, and (iii) a sulfonylamide compound conforming to the formula

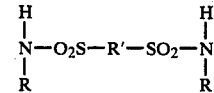

wherein R and R' independently are organic radicals.

2. The resin of claim 1 wherein said R' is selected from the group consisting of organic radicals derived from bisphenols which are suitable in the synthesis of polycarbonates.

3. The resin of claim 1 wherein said R' is an organic radical derived from diphenol ether and said R is a phenyl radical.

4. The resin of claim 1 wherein said R' is an organic radical derived from a biphenol and said R is a phenyl radical.

5. The resin of claim 1 wherein said organic radicals are aromatic.

6. In the polycondensation process for the preparation of polycarbonate resin from at least one aromatic diphenol and a carbonate precursor the improvement comprising admixing within the reaction mixture an effective amount of sulfonylamide having a molecular structure

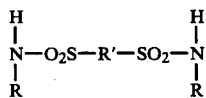

wherein R and R' independently are organic radicals, said polycarbonate resin being characterized by improved flame resistance.

7. The process of claim 6 wherein said organic radicals are aromatic.

8. The process of claim 6 wherein said R' is a diphenyl ether radical and R is a phenyl radical.

9. The process of claim 6 wherein said R' is a biphenyl radical and R is a phenyl radical.

10. The process of claim 6 wherein said effective amount is from 0.1 to 30.0 percent relative to the number of mols of biphenols and sulfonylamide.

11. The polycarbonate resin prepared by the process of claim 6.

12. The resin of claim 1 further comprising about 0.01 to 1 percent of perfluoroalkane sulfonic acid salt of an alkali metal, said percent being relative to the weight of said resin plus said salt.

13. The resin of claim 1 wherein said reaction said (iii) is present in an amount of between 0.1 and 30 percent relative to the total molar amount of said (i) and (iii).

* * * * *

UNITED STATES PATENT AND TRADEMARK OFFICE
CERTIFICATE OF CORRECTION

PATENT NO. : 4,399,271
DATED : August 16, 1983
INVENTOR(S) : John R. Sanderson

It is certified that error appears in the above—identified patent and that said Letters Patent is hereby corrected as shown below:

Delete the formula in the Abstract and insert the following formula therefor:

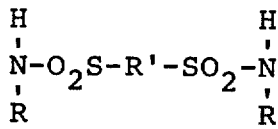

In column 2, delete formulae (1) and (2) and insert the following formulae therefor:

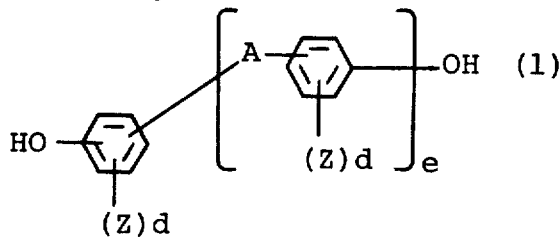 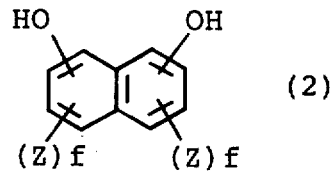

Signed and Sealed this

First Day of May 1984

[SEAL]

Attest:

GERALD J. MOSSINGHOFF

Attesting Officer    Commissioner of Patents and Trademarks